INVENTOR.
CHARLES STROHMEYER Jr.

United States Patent Office 3,507,747
Patented Apr. 21, 1970

3,507,747
HEAT EXCHANGE APPARATUS FOR EXTRACTING HEAT FROM A NUCLEAR FUEL HEAT PRODUCER
Charles Strohmeyer, Jr., Wyomissing, Pa., assignor to Electrodyne Research Corporation, Reading, Pa.
Filed July 14, 1967, Ser. No. 653,475
Int. Cl. G21c 15/04
U.S. Cl. 176—51                    13 Claims

ABSTRACT OF THE DISCLOSURE

The invention provides an apparatus for circulating coolant fluid flow through a nuclear reactor wherein there are multiple conduit assemblies each having a high temperature coolant fluid circuit flowing around a portion of the nuclear fuel elements and a lower temperature coolant fluid circuit encompassing the high temperature circuit within the conduit assembly outer wall, the outer wall providing structural containment of the internal fluids, the high temperature circuits having recirculation and pumping means and means to exchange heat with the fluid effluent from the lower temperature coolant fluid circuit before delivery of said effluent to a steam consumer.

---

Figure 1:
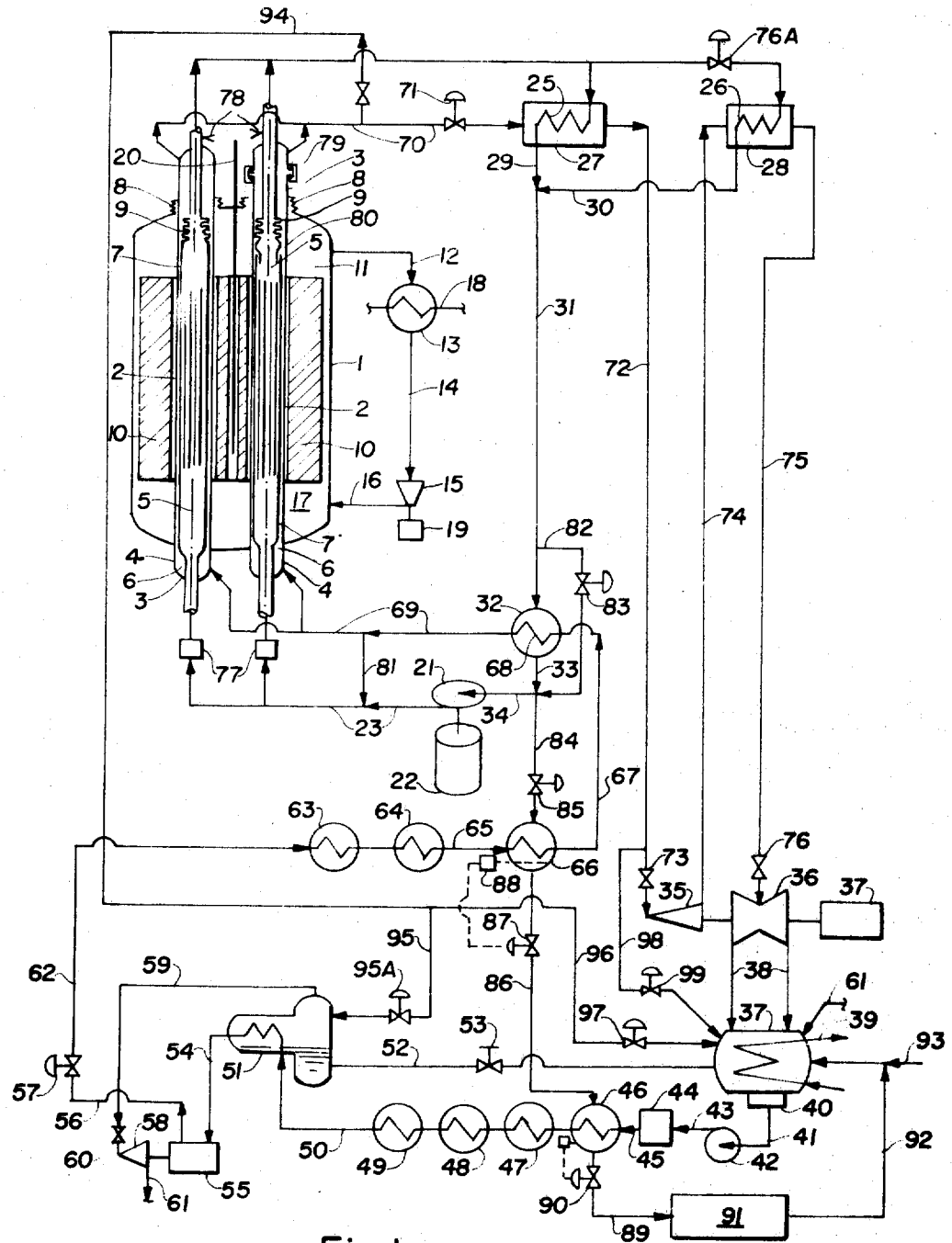

This invention relates to a heat exchange apparatus for extracting heat from a nuclear fuel heat producer wherein said apparatus and said nuclear fuel heat producer are interdisposed one with the other.

In the past it has been difficult to obtain high level energy from a nuclear reactor for use in a heat consuming power producer where the reactor coolant is a high density fluid in liquid or vapor form. High temperature heat transfer between the nuclear fuel and coolant fluid has created problems associated with containment and/or distribution of the coolant fluid wtihin the reactor coolant fluid circuits and/or maximum temperature at which the reactor coolant fluid can be contained at high pressure.

Even though the nuclear fuel elements are provided with a protective cladding (e.g. stainless steel shell), there is a tendency for the cladding isolation integrity to fail and radio-active contamination of the coolant fluid results at the points where the nuclear fuel comes in direct contact with the coolant fluid. When the reactor coolant fluid becomes contaminated its use in a power producer introduces access, shielding or containment problems associated with the power producer. This requires that some interposing means between the reactor circuits and power producer be provided to minimize contamination in the power producer such as secondary or secondary and tertiary cycles in combination cascading heat from the reactor primary coolant cycle to the secondary cycle and to the tertiary cycle where employed before steam is delivered to the power producer. Heat exchange between the multiple cascading, recirculating fluid cycles requires costly heat transfer equipment and tends to degrade the level of heat available in the power producer. This deteriorates the efficiency of the combined plant increasing the amount of waste heat which cannot be converted to useful energy.

For example, where light water is used as a coolant in a nuclear reactor, saturated steam may be generated in the primary coolant circuit at pressures in a range of 600 to 800 p.s.i.a. Steam superheating cannot be accomplished directly in the primary circuit and a mixture of steam and water in alternate contact with the fuel elements limits maximum power density which can be tolerated in the fuel element cluster or core.

Where the reactor coolant is light water at high pressure to suppress the formations of vapor, the high pressure containment shell is costly. A secondary water-steam cycle is required to extract heat from the high pressure reactor primary recirculating coolant circuit to generate low pressure essentially saturated vapor for use in a power producer. The heat rate for such a cycle is poor. Where the power producer is a steam turbine, the steam is quickly condensed in the blade path as heat is converted to work and moisture must be withdrawn at several stages in the blade path before the expansion of steam through the turbine is completed.

Where the reactor coolant is liquid sodium at high temperature, distribution of fluid flow with respect to power density within the reactor is a problem, contamination in the reactor coolant circuit is high, circulation ratio of primary coolant fluid within the reactor is high and differential temperature of the coolant fluid through the reactor tends to be minimal requiring a high temperature containment structure for the coolant fluid in the case where high level energy for a power producer is generated from the heat absorbed by the reactor primary coolant circuit. A secondary sodium cycle in heat exchange with the primary coolant cycle is normally employed to reduce contamination in the secondary cycle so that heat may be exchanged safely between the secondary sodium cycle and a tertiary water cycle which generates steam for use in a power producer. Since hot liquid sodium and water in direct contact with each other react violently, the integrity of the containment interface between the two fluids must be as nearly perfect as possible.

The subject invention relates solely to the arrangement of the reactor coolant circuits in relation to the nuclear fuel elements. It is in no way related to the configuration of the nuclear fuel elements, the composition of the nuclear fuel, or the moderation or control means necessary for sustaining the nuclear heat producing process. The invention is dependent upon known systems capable of producing the required nuclear reaction.

The subject invention overcomes past difficulties by division of reactor-coolant fluid flow among many parallel tubular conduit assemblies. Each conduit assembly contains a portion of the total number of nuclear fuel elements which are longitudinally disposed throughout the length of the tubular conduit assembly. The coolant fluid flows in parallel relationship with the longiutdinally disposed fuel elements. An inner high temperature fluid coolant circuit of the recirculation type directs fluid around the fuel elements. An outer lower temperature fluid coolant circuit encompasses the inner circuit, the two circuits having a common wall separating them.

The inner and outer circuits are operated at essentially the same pressure. The outer wall of the outer circuit at lower temperature (e.g. 742° F.) can thereby contain the fluid pressure in the inner circuit at higher temperature (e.g. 1040° F.). The common wall between the two circuits will be at some intermediate temperature.

Integrity of the isolation barrier which the common wall provides between the circuits is not dependent upon the tensile strength of the material. Thus, a relatively thin wall can be used.

Division of the coolant fluid flow among many parallel tubular conduit assemblies reduces the outside diameter required for the individual tubular conduit assemblies. Thus, if the outside diameter of each assembly can be maintained small in dimension (e.g. 3 inches to 10 inches) the outer tubewall thickness required even for coolant fluid containment at 3500 p.s.i.a. and 742° F. in the case of water permits a practical construction to be employed for a heat exchange apparatus.

The common wall between the circuits protects the fluid flowing through the outer circuit from contamination by direct contact with the fuel elements.

Fluid recirculating in the inner circuits exchanges heat with the fluid passing through the outer circuits externally of the reactor vessel in conduit extensions upstream and downstream of the reactor. Closed circuit heat exchangers are used in such case to isolate the fluid in one circuit from the fluid in the other circuit.

The penetration of the secondary loop within the reactor shell as described above permits the secondary loop to absorb heat directly from the products of the nuclear reaction as well as heat from the inner circuit through the common wall. This minimizes the amount of total secondary heat exchange surface required.

Where water is used as a reactor coolant the subject invention permits the use of supercritical pressure at high temperature to develop a source of high level energy for a power producer. Heat transfer rates are higher in the supercritical pressure range than they are at a subcritical pressure level. Also, the problems resulting from the presence of a two phase mixture within the reactor are eliminated.

A similar type of reactor construction can be utilized where liquid sodium is the coolant. The multiple conduit assemblies permit sodium coolant fluid to be distributed more proportionately throughout the reactor core to accommodate variations in power density. The outer or secondary sodium loop incorporated in the reactor core reduces the total amount of heat exchange surface required.

The multiple conduit assemblies permit a more flexible reactor fuel assembly and moderation system arrangement. The size of the reactor is not limited by pressure vessel or coolant fluid distribution considerations.

A specific object of this invention is to provide a heat exchange apparatus for extracting heat from a nuclear fuel heat producer wherein said apparatus and said nuclear fuel heat producer are interdisposed one with the other, said apparatus comprising multiple parallel tubular conduit assemblies for flowing coolant fluid in parallel relationship with longitudinally disposed coordinated nuclear fuel heat producing elements, each of said multiple parallel tubular conduit assemblies consisting of an inner coolant fluid circuit for flowing fluid around a portion of the total number of said longitudinally disposed coordinated nuclear fuel heat producing elements, and an outer coolant fluid circuit encompassing said inner circuit and separated from said inner circuit by a common partition wall, said common partition wall exchanging heat between the coolant fluid flowing through said inner circuit with the coolant fluid flowing through said outer circuit, fluid recirculation conduit means for collecting said coolant fluid from the discharge of said inner circuits and conveying said fluid through closed circuit heat exchange and pumping means and returning said fluid to the inlet of said inner circuits, fluid discharge conduit means from said outer circuits including a first separate fluid circuit in said closed circuit heat exchange means whereby heat absorbed by said coolant fluid flowing through said inner circuit may be exchanged with said fluid flowing through said first separate circuit after discharge from said outer circuits, the outlet of said discharge conduit means connecting to a heat consuming means.

Another object is to provide a means for supplying coolant fluid to said outer circuits in heat exchange with said closed circuit heat exchange means.

A further object is to provide a means of containing fluid pressure in said inner circuits wherein the temperature of the containment structure is substantially lower than the fluid temperature in said inner circuits.

A still further object is to provide a fluid throttling means in said discharge conduit means upstream of said first separate fluid circuit.

A still further object is to provide a fluid reheating means in said closed circuit heat exchange means.

A still further object is to provide a fluid bypass conduit connected to said discharge conduit means upstream of said first separate circuit.

A still further object is to provide fluid proportioning means for controlling the temperature rise of the coolant fluid supply to said outer circuit across said closed circuit heat exchange means.

A still further object is to provide a means to equalize fluid pressures between said inner and outer circuits.

A still further object is to provide a means of coolant fluid makeup and blowdown to and from said inner circuit.

Figure 2:
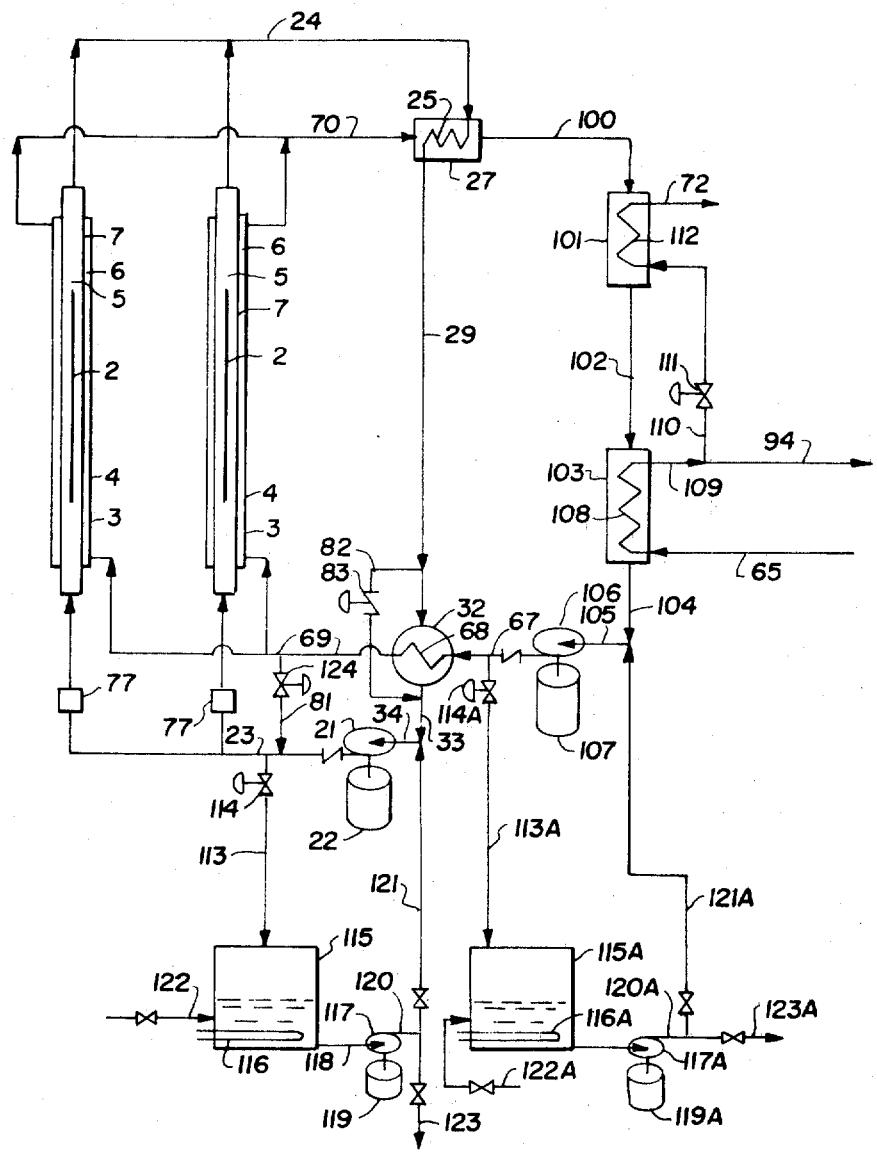

The invention will be described in detail with reference to the accompanying drawings wherein:

FIGURE 1 is a schematic diagram of a nuclear reactor supercritical pressure water coolant system in combination with a steam and water cycle for powering a steam turbine driver, and FIGURE 2 is a schematic diagram of a nuclear reactor liquid sodium coolant system in combination with a steam and water cycle for powering a steam turbine driver.

In FIGURE 1, a typical reactor nuclear process is shown. Reactor vessel 1 is a vertical cylinder with elliptical dished heads on the top and bottom. Nuclear fuel elements 2 are in the form of rods arranged in clusters throughout the reactor vessel 1. The individual rods 2 are stainless steel clad and are disposed vertically in the reactor vessel 1 and parallel with each other. The disposition of the rods are coordinated in a manner to produce the required nuclear reaction.

The fuel rod 2 clusters are encased in tubular conduit assemblies 3. There are many conduit assemblies 3, the total number depending on the power rating of the unit, of which only two are shown for purposes of illustration. The conduit assemblies 3 are vertically disposed and arranged for flowing coolant fluid in parallel relationship with the longitudinally disposed fuel rods 2. There may be as many as several hundred conduit assemblies required for a large capacitor reactor in the 1000 mw. electrical range.

The outer shell 4 of conduit assemblies 3 provides a high pressure containment structure for the coolant fluid within. There are two coolant fluid circuits through each conduit assembly 3, an inner coolant circuit 5 and an outer coolant circuit 6. Circuits 5 and 6 are separated by a common tubular wall 7 which provides isolation between the circuits. The boundary for circuit 5 is the inner surface of tubular wall 7. Circuit 5 encompasses fuel elements 2 which may be supported by means of attachments to wall 7. The boundary for circuit 6 is the outer surface of tubular wall 7 and the inner wall of outer shell 4.

Expansion bellows 8 are provided to permit differential movement between conduit assemblies 3 and reactor vessel 1. Expansion bellows 9 are provided at an intermediate location in tubular wall 7 between the points where outer shell 4 connect to tubular wall 7. Expansion bellows 9 permit differential movement between outer shell 4 and tubular wall 7. Thus, the uniform characteristic of outer shell 4 is undisturbed by means for expansion and outer shell 4 can be designed to resist high internal fluid pressure.

In the FIGURE 1 example, supercritical pressure water at 3600 p.s.i.a. is used as the reactor coolant. The state of the water (whether liquid or vapor) is dependent upon fluid temperature. The reaction is moderated by graphite block 10. Helium gas is circulated through channels in block 10 (not shown) and between conduit assemblies 3 and block 10 to cool block 10 while the fuel rods 2 are undergoing reaction.

Hot gas is collected from plenum chamber 11 conveyed through conduit 12, through heat exchanger 13 shell and conduit 14 to blower 15 which is powered by driver 19. Blower 15 discharges through conduit 16 to plenum chamber 17 which distributes cooling gas through block 10 to plenum chamber 11, from whence it is recirculated. Cooling circuit 18 through heat exchanger 13 removes heat from the recirculating helium gas cooling block 10.

Other means of moderation or moderation cooling may be employed.

Control rods 20 regulate the nuclear process. One representative rod is shown. Many more are required to suit the particular physics of the fuel composition and configuration as well as the composition of the poison in the rods. The depth of penetration of control rods 20 regulates the degree of nuclear reaction which takes place. Withdrawal of the rods increases the reaction in the fuel zone below the rods.

Pump 21 driven by motor 22 circulates coolant fluid (water in this illustration) through conduit 23 to inner circuit 5, through inner circuit 5 around fuel rods 2 and out through conduit 24 which connects to tubular heat exchange surfaces 25 and 26 in heat exchangers 27 and 28 respectively. Tubular heat exchange surfaces 25 and 26 discharge through conduits 29 and 30 respectively to conduit 31 which in turn discharges to the shell side of balancing heat exchanger 32. The shell side of heater 32 discharges through conduits 33 and 34 in series to the suction of pump 21. Pump 21 recycles the fluid through circuits 5.

Fluid in circuits 5 in direct contact with fuel rods 2 is high in temperature as it exits from tubular conduit assemblies 3 (e.g. 1040° F.). At maximum continuous rating the fluid temperature entering the inner circuits 5 will be approximately 715° to 760° F.

The steam and water cycle absorbing heat from the process for conversion to work passes through outer circuits 6. Tubular walls 7 isolate the outer circuits 6 from the fuel rods 2. Thus, contamination of the coolant in circuits 6 as a result of direct contact with fuel elements 2 is eliminated. The quality of the water coolant supplied to circuits 6 is of the highest purity.

High pressure steam turbine 35 and reheat turbine 36 drive electric generator 37. Reheat turbine 36 exhausts to steam condenser 37 through conduits 38. Circuits 39 convey cooling water through condenser 37 to condense the steam. Hotwell 40 collects the condensed liquid which passes through conduit 41 to the suction of condensate pump 42.

Condensate pump 42 discharges fluid through conduit 43 to water purification equipment 44. Purification equipment 44 discharges fluid through conduit 45 to the tube side of low pressure heaters 46, 47, 48 and 49 in series, through conduit 50 to the tube side of heater 51 equipped with a flash tank section. The shells of heaters 46, 47, 48, 49 and 51 receive steam from reheat turbine 36 extraction points through conduit and flow control means not shown in ascending order of pressure from heater 46 to 51. The shell drains from heater 51 cascade to the shell of heater 49, to the shell of heater 48, to the shell of heater 47, and to the condenser through conduit and flow control means not shown.

The effluent from heater 51 tubes flows through conduit 54 to the suction of high pressure feedwater pump 55 which raises the fluid pressure to the working pressure of the reactor coolant circuits.

Auxiliary steam turbine 58 drives pump 55 receiving steam from the steam space of heater 51 through conduit 59. Turbine 58 exhausts to condenser 37 through conduit 61. Steam admission valves 60 control turbine 58 speed to control fluid flow to circuits 6 coordinated with control of valve 57. Feedwater pump 55 discharges fluid through conduits 56 and 62 in series to the tube side of high pressure feedwater heaters 63 and 64 in series, through conduit 65 to the tube side of blowdown heat exchanger 66 and through conduit 67 to and through tubular circuits 68 in balancing heat exchanger 32, through conduit 69 to the inlet of outer circuits 6 in reactor shell 1.

The shells of high pressure heaters 63 and 64 receive steam from turbine extraction steam sources through conduit and flow control means not shown. The shell drains from heater 64 cascade to heater 63 shell and to heater 51 shell through conduit and flow control means not shown. Conduit 52 and flow control valve 53 provide an emergency dump of drains from heater 51 shell to condenser 37.

The fluid flowing through circuits 6 cools the tubular walls 7 and the outer shells 4 of conduit assemblies 3 maintaining metal temperature within a high tensile strength range for the materials employed for constructing outer shells 4 and tubular walls 7. This reduces wall thickness required for shells 4 to contain the high pressure fluid in circuits 5 and 6 and minimizes corrosion in tubular walls 7. The fluid outlet temperature from circuits 6 (e.g. 742° F.) will be substantially lower than the outlet fluid temperature from circuits 5. The inlet fluid temperature to circuits 6 at maximum continuous rating will be approximately 690° to 720° F.

Conduits 70 convey fluid from the outer circuits 6 to the shell side of heat exchanger 27. Throttling valve 71 located in conduit 70 is capable of reducing downstream fluid pressure in heat exchanger 27 shell for controlling fluid enthalpy at the shell outlet in conduit 72 which supplies steam to high pressure turbine 35 through steam admission valves 73. At partial loads reduced pressure downstream of throttling valve 71 helps to maintain more uniform steam temperature conditions in high pressure turbine 35 throughout the load range.

High pressure turbine 35 exhausts stea through conduit 74 to the shell side of heat exchanger 28 from whence after reheating steam flows through conduit 75 and interceptor valves 76 to reheat turbine 36.

Heat exchanger 13 may be used in parallel or in series with or as a substitute for heat exchanger 28 depending upon the thermodynamics of the particular cycle. In such case circuit 18 would be coordinated with conduits 74 and 75.

Flow control valve 76A biases fluid flow quantity through tubular heat exchange surface 26 with respect to heat exchange surface 25 for purposes of steam temperature control in conduit 75. Additional orificing means (not shown) may be required in conduit 24 at the inlet to tubular surface 25 to achieve the necessary regulation.

Conduit 23 at the inlet to circuits 5 may optionally be provided with variable throttling means 77 for selectively proportioning fluid flow among individual or groups of tubular conduit assemblies 3 to vary coolant fluid flow proportionately with changes in power density throughout the reactor core. Where power density from the nuclear reaction varies symmetrically throughout the core (e.g. concentric rings of similar power density), the coolant supply conduits 23 to the conduit assemblies 3 associated with said symmetrical pattern may be grouped and flow to an individual group may be controlled by a single variable throttling orifice 77. Other individual groups would also be controlled by a single variable throttling orifice 77.

Throttling orifice 77 can be designed so that a minimum amount of coolant fluid will always pass through each of circuits 5 to prevent destruction of the element. Temperature monitoring thermocouples 78 measure representative temperatures at the outlets of circuits 5 and connect to a control matrix (not shown) for controlling throttling orifices 77. The throttling orifices 77 associated with the highest temperature are in the open working position and the position of the other orifices are referenced thereto.

The fluid mass flow through circuit 5 is substantially greater than the fluid mass flow through circuit 6, especially at partial loads. Thus, temperature disturbances at the outlets of circuits 5 will be suppressed as the greatest power density unbalance could be expected at partial loads. High temperature material stress considerations are limited to a zone outside of the reactor vessel 1 since circuits 5 extend through circuits 6 outside reactor vessel 1 assuring that damage will not first occur internally within reactor vessel 1.

Should a localized hot spot develop at the outlet of either circuits 5 or 6, the average outlet fluid temperature of both circuits may be reduced. Fluid pressure downstream of throttling valve 71 may be reduced with some sacrifice of unit capacity. This will tend to maintain uniform fluid enthalpy in conduit 72 (e.g. fluid enthalpy in conduit 72 at 3500 p.s.i.g. and 1000° F. is 1424 B.t.u./pound and at 2500 p.s.i.g. and 950° F. it is approximately the same value; the same is true of 1500 p.s.i.g., 900° F. fluid). Such operation protects the integrity of steam conditions within high pressure turbine 35, and is feasible as a result of the higher circuit 5 to circuit 6 fluid mass flow ratio as unit output is reduced below rating.

Pump 21 is of the centrifugal type. Such pumps deliver a constant volume of fluid at the same total dynamic head. Thus, the pump 21 becomes partially self regulating with respect to maintaining relatively uniform inlet fluid temperature to circuits 5 and effecting reduction of mass flow through circuits 5 as unit output is reduced below rating.

The following are typical examples in the case where the respective fluid heat absorption in circuits 5 and 6 is in a ratio of 3 to 1. Where fluid in circuit 24 heats reheat steam in heat exchanger 28 and the following conditions exist:

|   | ° F. |
|---|---|
| Feedwater temp. (conduit 67) | 492 |
| Throttle steam (conduit 72), 3515 p.s.i.a. | 1000 |
| Reheat steam (conduit 75), 651 p.s.i.a. | 1000 | performance in circuits 5 and 6 at maximum continuous rating would be approximately as follows:

|   | ° F. |
|---|---|
| Circuit 5 inlet fluid | 724 |
| Circuit 5 outlet fluid | 1040 |
| Circuit 6 inlet fluid | 709 |
| Circuit 6 outlet fluid | 742 |

Fluid mass flow ratio, circuit 5:circuit 6=200:100.

At 37 percent of maximum continuous rating and the following conditions:

|   | ° F. |
|---|---|
| Feedwater temp. | 397 |
| Throttle steam, 2205 p.s.i.a. | 990 |
| Reheat steam, 248 p.s.i.a. | 1000 | performance in circuits 5 and 6 would be approximately as follows:

|   | ° F. |
|---|---|
| Circuit 5 inlet fluid | 755 |
| Circuit 5 outlet fluid | 1030 |
| Circuit 6 inlet fluid | 693 |
| Circuit 6 outlet fluid | 742 |

Fluid mass flow ratio, circuit 5:circuit 6=123:37.

Where heat exchanger 13 substitutes for heat exchanger 28 and the same conditions at maximum continuous rating exist, performance in circuits 5 and 6 would be approximately as follows:

|   | ° F. |
|---|---|
| Circuit 5 inlet fluid | 718 |
| Circuit 5 outlet fluid | 1040 |
| Circuit 6 inlet fluid | 714 |
| Circuit 6 outlet fluid | 742 |

Fluid mass flow ratio, circuit 5:circuit 6=133:100.

For the same conditions at 37 percent of maximum continuous rating, and where heat exchanger 13 substitutes for exchanger 28, performance in circuits 5 and 6 would be approximately as follows:

|   | ° F. |
|---|---|
| Circuit 5 inlet fluid | 734 |
| Circuit 5 outlet fluid | 1030 |
| Circuit 6 inlet fluid | 711 |
| Circuit 6 outlet fluid | 742 |

Fluid mass flow ratio, circuit 5:circuit 6=80:37.

Nuclear fuel rods 2 are encased in conduit assemblies 3. From time to time the nuclear fuel rods 2 must be replenished or reprocessed and there must be access to the rods. Conduit assemblies 3 may be an all welded structure as is shown by the left hand assembly in FIGURE 1. In such case, access to the rods 2 would be obtained by cutting into conduit assemblies 3 in place or removed from the reactor vessel 1. After replacement or replenishment of rods 2, the assemblies would be rewelded.

An alternative means of access to fuel rods 2 is shown on the right hand assembly in FIGURE 1. The outer shell 4 of conduit assembly 3 is provided with a clamp type coupling 79 in the extension piece on the outside of reactor vessel 1. Clamp type coupling 79 may be as manufactured by the Gray Tool Company, 7135 Ardmore St., Houston, Tex., U.S.A. and as shown in their "Grayloc Pipe Fittings Catalog 67." The Grayloc pipe connection clamps are provided with holding bolts. In place of the holding bolts, tension on the clamps could be obtained through a process of compression, heating and welding shrinkage providing a weldment type of seal. The welds in the clamps could be cut to provide access to the tube internals.

Couplings 79 could be alternately spaced at various heights along the extension of conduit assemblies 3 beyond reactor vessel 1 shell to permit close parallel arrangement of conduit assemblies 3 one with another and to provide the necessary access to couplings 79. The outer shell 4 at the coupling joint is prepared specially to receive the coupling. A seal ring (not shown) may be provided in the joint.

A slip type joint 80 is provided in tubular wall 7 to permit removal of the entire end of conduit assembly 3 and provide access to fuel rods 2. Special tools (not shown) are required to protect and properly position expansion bellows 9 during assembly and disassembly of coupling 79. Expansion bellows 9 may be provided with internal and/or external liners to produce non-turbulent flow of fluid coolant across expansion bellows 9 (not shown).

Slip joint 80 can alternately be located in tubular wall 7 on the opposite side of fuel rods 2 (below the fuel rods 2 on FIGURE 1) so that the fuel clusters 2 would be removed simultaneously with the removal of the ends of conduit assemblies 3 after breaking coupling 79.

Slip joint 80 could alternatively be used with the left hand conduit assembly 3 illustration in FIGURE 1. This would facilitate removal of fuel rods 2 after cutting outer shell 4.

Since circuits 5 and 6 are operated at essentially the same fluid pressure, sealing of slip joint 80 is no problem. Conduit 81 equalizes fluid pressure between the circuits. Reactor vessel 1 and other components bearing radioactive contamination require containment in another structure (not shown) protecting the environment surrounding the unit from radioactive contamination. During normal operation of the unit human access to reactor vessel 1 is not available. However, all fluid pressure connections to conduit assemblies 3 and all high temperature conduits subject to high stress are located external to reactor vessel 1. Thus, the integrity of these parts can be monitored visually through the use of closed circuit television cameras located within the radioactive containment structure transmitting pictures to remote receivers external to the radioactive containment structure.

Heat exchanger 32 bypass conduit 82 and fluid flow control valve 83 permits regulation of fluid temperature at the outlet of circuits 5 and 6. The bypass could alternatively be connected to conduits 67 and 69 permitting feedwater flow to bypass tubular circuits 68 in heat exchanger 32.

Increasing the quantity of fluid flow through bypass 82 increases the fluid enthalpy entering and leaving circuits 5. This raises the fluid temperature. Correspondingly fluid enthalpy entering and leaving circuits 6 is reduced lowering fluid temperature.

The average temperature of the two circuits 5 and 6 may be increased by increasing the ratio of the heat output from fuel rods 2 to the quantity feedwater entering circuits 6 from conduit 69. The said average temperature of circuits 5 and 6 may be decreased by decreasing the ratio of heat output from fuel rods 2 to the quantity of feedwater entering circuits 6 from conduit 69.

Inclusion of circuit 6 within reactor vessel 1 provides the unit with a fast speed of response. Energy change to turbines 35 and 36 may be accomplished quickly to meet electrical requirements of generator 37. Circuits 6 act as a thermal accelerator for the cycle.

Turbine generator 35, 36 and 37 may be of the conventional type responsive to frequency variations of the connected electrical system through control action of steam admission valves 73 responsive to turbine speed change. The controls for the FIGURE 1 system function similarly to those for a conventional unit firing fossil fuel in a once-through type steam generator.

Normally the quantity of fluid flow to circuits 6 from conduit 69 parallels steam demand to turbine 35 through conduit 72. However, minimum flow through circuits 6 is approximately one-third of maximum continuous rating. Pressure in reactor circuits 5 and 6 is normally controlled by speed of feedpump 55 to regulate feedwater flow and in parallel relationship with control rod 20 movements so that feedwater flow and heat generation increases and decreases are proportionate one with the other. Control valve 57 may assist in such regulation during low load or transient conditions. Pressure in conduit 72 may be ramped from 1000 p.s.i.a. at time of synchronizing the turbine generator 35, 36 and 37 to 3515 p.s.i.a. at a higher unit loading (e.g. 70 percent of maximum continuous rating) by means of throttling action through valve 71. Valve 71 position is responsive to load demand corrected for throttle pressure deviation upstream of steam admission valves 73. Over-riding control features close valve 71 to protect the pressure integrity of circuits 5 and 6.

Feedwater temperature to conduit 65 is a function of load change and unregulated turbine extraction steam pressures.

Main steam temperature control in conduit 72 is a function of varying feedwater flow in inverse relationship with heat generation from fuel rods 2. To increase steam temperature heat generation is increased and feedwater flow is decreased and vice versa. In such case control rods 20 are withdrawn while pump 55 speed is decreased and vice versa.

Fluid temperature at the outlet of circuits 5 and 6 may be adjusted for reasons of safety as described above. Flow through conduit 82 may be adjusted repsonsive to load demand change to optimize heat transfer and temperature conditions throughout the combined loops.

Reheat steam temperature in conduit 75 is a function of fluid quantity and enthalpy passing through tubular heat exchange surface 26.

Recycling fluid in circuits 5, conduits 24, 25, 29, 31, heat exchanger 32, conduits 33 and 34, pump 21, conduits 23 back to circuits 5 causes radioactive contamination to accumulate. The accumulation must be maintained within safe limits. To achieve this fluid blowdown in an amount of approximately 3 percent of maximum feedwater flow is extracted from conduit 33 through conduit 84 and flow control valve 85 which discharge to the shellside of blowdown heat exchanger 66 at reduced pressure forming steam and water. Steam condenses heating feedwater to conduit 67. Heater 66 shell is controlled by flow control valve 87 and level controller 88.

A portion of the flow quantity in 65 may bypass heat exchanger 66 direct to conduit 67 through conduit means not shown.

Conduit 86 discharges to blowdown heat exchanger 46 shell at reduced pressure. The drains from exchanger 46 shell pass through conduit 89 and flow control valve 90 to water purification equipment 91 capable of removing nuclear impurities. The blowdown fluid may be discharged to waste when safe or the pure portions thereof may be returned to condenser 37 through conduit 92. Cycle makeup enters condenser 37 through conduit 93.

Make up to circuits 5 required as a result of blowdown through conduit 84 enters by way of conduit 23 from conduits 81, 69, 68, 67 and feed pump 55 discharge.

In order to prevent contamination of circuits 6 as a result of back flow through conduit 81 at times when there is a fluid volume swelling in circuits 5 and the associated recirculation loop accompanying changes in heat input to the cycle from fuel rods 2, opening of blowdown valve 85 must be coordinated therewith to absorb such surges and assure unidirectional flow from conduit 69 to conduit 23 through conduit 81. The blowdown system must be sized accordingly and storage capacity may be required in purification equipment 91 to absorb such surges. Directional flow measuring means (not shown) can coordinate valve 85 opening with such requirements.

It was stated that minimum flow through circuits 6 is approximately one-third of maximum continuous rated flow. When flow through superheater 27 to conduit 72 drops below minimum flow in circuits 6 it is necessary to bypass flow from circuits 6 through conduits 94, 95 and flow control valve 95A to heater 51 or through conduits 94, 96 and flow control valve 97 to condenser 37. The circuits are at full operating pressure upstream of valves 95A and 97. Downstream of the valves the pressure is reduced to the working pressure of the system.

The startup system is simple and small sized pipes can be used to carry away the required fluid flow quantities. The startup system bypasses the superheater and fluid temperatures will be below 750° F. simplifying materials and construction.

Bypass fluid discharged to heater 51 can be used for heating feedwater and generating auxiliary steam for use in turbine driver 58.

Bypass fluid discharged to condenser 37 dissipates heat so that feedwater can be returned at a low temperature to circuits 68 in heat exchanger 32. This provides a means for dissipating heat absorbed in circuits 5.

Conduit 98 and flow control valve 99 provide a drain and warm up line from conduit 72 at the turbine throttle to the condenser. Conduit 98 can be used to warm up the superheater 27 and steam leads 72 prior to rolling the turbine generator 35, 36 and 37.

An example of startup conditions parallelling the above conditions is as follows:

Where the circuit 5 and associated recirculation loop provide heat for steam reheating in exchanger 28 and the following conditions prevail after synchronizing:

Steam flow to turbine 35—10 percent max. cont. rating
Feedwater flow to conduit 67—33 percent max. cont. rating
Throttle steam, 1000 p.s.i.a.—900° F.
Reheat inlet steam, 59 p.s.i.a.—900° F.
Feedwater temp. to conduit 67—340° F.

the following performance may be expected for circuits 5 and 6:

|  | ° F. |
|---|---|
| Circuit 5 inlet fluid | 775 |
| Circuit 5 outlet fluid | 910 |
| Circuit 6 inlet fluid | 713 |
| Circuit 6 outlet fluid | 742 |
| Fluid mass flow ratio, circuit 5:circuit 6=115:33. | |

For the same conditions and where heat exchanger 13 substitutes for heat exchanger 28 the following performance may be expected for circuits 5 and 6:

|  | ° F. |
|---|---|
| Circuit 5 inlet fluid | 734 |
| Circuit 5 outlet fluid | 910 |
| Circuit 6 inlet fluid | 715 |
| Circuit 6 outlet fluid | 742 |

Fluid mass flow ratio, circuit 5:circuit 6=80:33.

The mass flow through circuits 5 should be noted. It is high in all cases of unit loading. The relative mass flow decrease with load compensates for the fact that as load decreases the maximum temperature in circuits 5 is reached lower and lower in the fuel rod cluster 2. Thus, there tends to be a somewhat uniform pressure drop through circuits 5 independent of unit loading.

The above discussion relates to FIGURE 1 which is adapted to the use of high pressure water (or steam dependent upon temperature) as a coolant for circuits 5 and 6. The principles of this invention can be applied equally well to other coolants for circuits 5 and 6 such as liquid sodium. FIGURE 2 illustrates the same principles adapted to a liquid sodium coolant system. One skilled in the art will have no difficulty in making the coolant substitution from the following explanation and wherein FIGURE 2 only shows those cycle features which are different from FIGURE 1 (items having similar functions have identical identification numbers):

Circuits 5, conduits 24, 25, 29, shell side of heater 32, conduits 33, and 34, pump 21 and conduit 23 comprise a primary sodium fluid coolant loop. Circuits 6, conduit 70, shell side of heater 27, conduit 100, shell side of heat exchanger 101, conduit 102, shell side of heat exchanger 103, conduits 104, 105, pump 106, conduits 67, 68, and 29 comprise a secondary sodium fluid coolant loop. Pump 106 is driven by motor 107.

The steam and water cycle shown on FIGURE 1 including conduit 72, turbine generator 35, 36 and 37, condenser 37, condensate pump 42, water purification equipment 44, low pressure heaters 47, 48, 49 and 51, feed pump 55 and turbine drive 58, high pressure heaters 63 and 64, and conduit 65 are essentially the same for FIGURE 2. However, rated pressure in conduit 72 may alternatively be in the subcritical pressure range. FIGURE 2 incorporates conduit 65 of FIGURE 1 on the high pressure-temperature end of the feedwater cycle and conduit 72 of FIGURE 1 for supplying steam to the turbine 35.

Conduit 65 connects to tubular circuits 108 in steam generator 103. Tubular heat exchange conduits 108 receive heat from the secondary sodium loop and discharge to conduit 109. In normal operation fluid flows through conduit 110 and throttling valve 111 to the inlet of tubular heat exchange conduit 112 in superheater 101. Tubular heat exchange circuits 112 also receive heat from the secondary sodium loop and discharge to conduit 72 supplying superheated steam to turbine 35 shown on FIGURE 1.

The primary sodium coolant loop operates in a temperature range of from 775° F. to 1100° F. The secondary sodium coolant loop operates in a temperature range of from 725° F. to 1050° F. The steam and water circuits may be operated in conventional temperature ranges for a wide selection of turbine cycle conditions. The upper temperature limits for the sodium cycles are approximate and are to be coordinated with the turbine steam cycle.

During unit startup fluid is bypassed through conduit 94 similar to the operation of FIGURE 1.

The primary sodium circuit discharges a small percentage of fluid flow through conduit 113 and flow control valve 114 to surge tank 115. Heater 116 maintains adequate temperature to sustain a sodium fluid state. Pump 117 takes suction from tank 115 through conduit 118. Pump 117 is driven by motor 119.

Pump 117 discharges through conduit 120 and 121 to conduit 34 connecting to the suction of pump 21. Pump 117 supplies make up to the primary sodium loop. Flow through conduit 113 accommodates variations in fluid specific volume in the primary sodium loop. Make up sodium enters tank 115 through conduit 122. Sodium may be removed from the cycle for reprocessing through conduit 123.

A similar circuit is shown for the secondary sodium loop. The suffix A accompanies identification numbers of components having similar functions to those for the primary sodium loop.

Conduit 81 and fluid flow control valve 124 regulates pressures between the secondary and primary sodium loops in emergency conditions. Normally the secondary loop fluid pressure is slightly higher than the fluid pressure in the primary loop. If the differential is excessive, flow control valve 124 opens to equalize pressures.

A secondary sodium loop is employed to minimize radio-active contamination in the shells of heat exchangers 101 and 103 thereby minimizing contamination of the water and steam flowing through conduits 108 and 112 and protecting against corrosion and failure of conduits 108 and 112. The latter is essential since sodium and water in direct contact produce a violent reaction.

In FIGURE 2 heavy water could substitute for the sodium coolant fluid in the primary and secondary loops.

Thus, it will be seen that I have provided an efficient embodiment of my invention whereby a means is provided for improving circulation of coolant fluid flow through a nuclear reactor, wherein a heat exchange apparatus incorporates multiple conduit assemblies each having a high temperature coolant fluid circuit flowing around a portion of the nuclear fuel elements and a lower temperature coolant fluid circuit encompassing the high temperature circuit within the conduit assembly outer wall, the outer wall providing structural containment of the internal fluids, the high temperature circuit and lower temperature circuit being isolated from each other internally and externally of the nuclear reactor, the high temperature circuits connecting to a recirculation conduit and pumping means, the recirculation conduit means having means to exchange heat with the effluent of the reactor lower temperature circuits before discharge to a heat consumer. In addition means are provided for supplying coolant fluid to the lower temperature circuits in heat exchange with the high temperature circuits external to the reactor, to circulate high pressure coolant fluid through the reactor, to throttle the lower temperature coolant effluent before heat exchange with the high temperature coolant fluid, to reheat steam intermediately from the heat consumer, to bypass fluid from the lower temperature effluent circuit before heat exchange with the recirculation means, to proportion heat levels in the two circuits, to equalize or regulate pressures between circuits and to supply coolant makeup and extract coolant blowdown from the circuits.

While I have illustrated and described several embodiments of my invention, it will be understood that these are by way of illustration only, and that various changes and modifications may be made within the contemplation of my invention and within the scope of the following claims.

I claim:

1. A heat exchange apparatus extracting heat from a nuclear fuel heat producer wherein said apparatus and said nuclear fuel heat producer are interdisposed one with the other, said apparatus comprising multiple parallel conduit assemblies flowing high density cooling fluid in parallel relationship with longitudinally disposed coordinated nuclear fuel heat producing elements, each of said multiple parallel conduit assemblies comprising an inner coolant fluid circuit flowing fluid around a portion of the total number of said longitudinally disposed coordinated nuclear fuel heat producing elements and an outer high density coolant fluid circuit encompassing said inner circuit and separated from said inner circuit by a common partition wall, said common partition wall exchanging heat between the coolant fluid flowing through said inner circuit with the coolant fluid flowing through said outer circuit, fluid recirculation conduit means collecting said coolant fluid from the discharge of said inner circuits and conveying said fluid through closed circuit heat exchange and pumping means and returning said fluid to the inlet of said inner circuits, discharge conduit means collecting fluid discharging from said outer circuits, a portion of said discharge conduit means comprising first heat exchange surface in said closed circuit heat exchange means which is adapted to significantly transfer heat absorbed by said coolant fluid flowing through said inner circuit to said fluid flowing through said discharge conduit means, said fluid in said discharge conduit means after heat exchange conveying away most of the heat produced by said nuclear fuel heat producer, the outlet of said discharge conduit means connecting to a heat consuming means, and coolant fluid supply means connected through conduit means to the inlet of said outer circuits.

2. A heat exchange apparatus as recited in claim 1 wherein a portion of said conduit means for supplying coolant fluid to said inlet of said outer circuits comprises a second heat exchange surface in said closed circuit heat exchange means which is adapted to significantly transfer heat absorbed by said coolant fluid flowing through said inner circuits to said fluid flowing through said conduit means supplying fluid to said inlet of said outer circuits.

3. A heat exchange apparatus as recited in claim 1 together with an outer peripheral containment shell for said outer circuit which contains fluid at high pressure within both of said outer and said inner circuits, the temperature of said containment shell being substantially below the temperature of the fluid in said inner circuit as a consequence of said outer circuit inlet fluid enthalpy value, coolant fluid mass flow rate through said outer circuit and isolation of said coolant fluid in said outer circuit from direct contact with said nuclear fuel heat producing elements.

4. A heat exchange apparatus as recited in claim 1 including a throttling valve in said discharge conduit means upstream of said first heat exchange surface, said throttling valve reducing downstream fluid pressure and increasing fluid enthalpy at the discharge of said first heat exchange surface for a specific fluid temperature.

5. A heat exchange apparatus as recited in claim 1 wherein fluid passing to said heat consumer after partial heat consumption is returned through conduit means to a separate fluid reheating circuit in said closed circuit heat exchange means which is adapted to transfer a remaining portion of the heat absorbed by said coolant fluid flowing through said inner circuit to said fluid flowing through said reheating circuit, the outlet of said reheating circuit connecting through conduit means to said heat consumer.

6. A heat exchange apparatus as recited in claim 1 wherein a bypass conduit is connected to said discharge conduit means upstream of said first heat exchange surface, said bypass conduit including means to flow fluid away from said discharge conduit means and to recycle fluid to the inlet of said outer circuit independently of fluid flow through said first heat exchange surface.

7. A heat exchange apparatus as recited in claim 1 including cross-connected conduit means between said inner and outer circuits and adapted for controlling inner circuit fluid pressure with respect to outer circuit fluid pressure.

8. A heat exchange apparatus as recited in claim 1 and wherein said heat consuming means comprises means for generating and superheating steam externally to said discharge conduit means, said coolant fluid supply means receiving fluid from said discharge conduit means downstream of said heat consuming means.

9. A heat exchange apparatus as recited in claim 1 including cross connected conduit means between said inner and outer circuits and adapted to supply coolant fluid makeup to said inner circuit from said coolant fluid supply means.

10. A heat exchange apparatus as recited in claim 2 wherein said first heat exchange surface and said second heat exchange surface are oriented serially in said closed circuit heat exchange means, said first heat exchange surface first receiving heat from fluid flowing through said recirculation conduit means direct from said discharge of said inner circuits.

11. A heat exchange apparatus as recited in claim 2 wherein fluid flow proportioning means are included to regulate the amount of fluid flowing through said recirculation conduit means which comes in direct contact with said second heat exchange surface in said closed circuit heat exchange means.

12. A heat exchange apparatus as recited in claim 2 wherein said conduit means for supplying coolant fluid to said outer circuit includes a fluid flow regulated bypass conduit around said second heat exchange surface.

13. A heat exchange apparatus as recited in claim 9 including a bypass conduit connected to said recirculation conduit means and flow control means adapted to flow fluid away from said recirculation conduit means at a controlled rate to a fluid purification system in response to the quantity of impurities in the fluid passing through the inner circuits and recirculation conduit means.

References Cited

UNITED STATES PATENTS

| | | | |
|---|---|---|---|
| 3,071,527 | 1/1963 | Young | 176—52 |
| 3,079,321 | 2/1963 | Oppenheimer et al. | 176—52 |
| 3,121,666 | 2/1964 | Wheelock | 176—54 |

CARL D. QUARFORTH, Primary Examiner

H. E. BEHREND, Assistant Examiner

U.S. Cl. X.R.

176—61, 65, 55